April 19, 1960
J. H. STARK
2,933,022
PROFILE CUTTER
Filed April 28, 1958
3 Sheets-Sheet 1
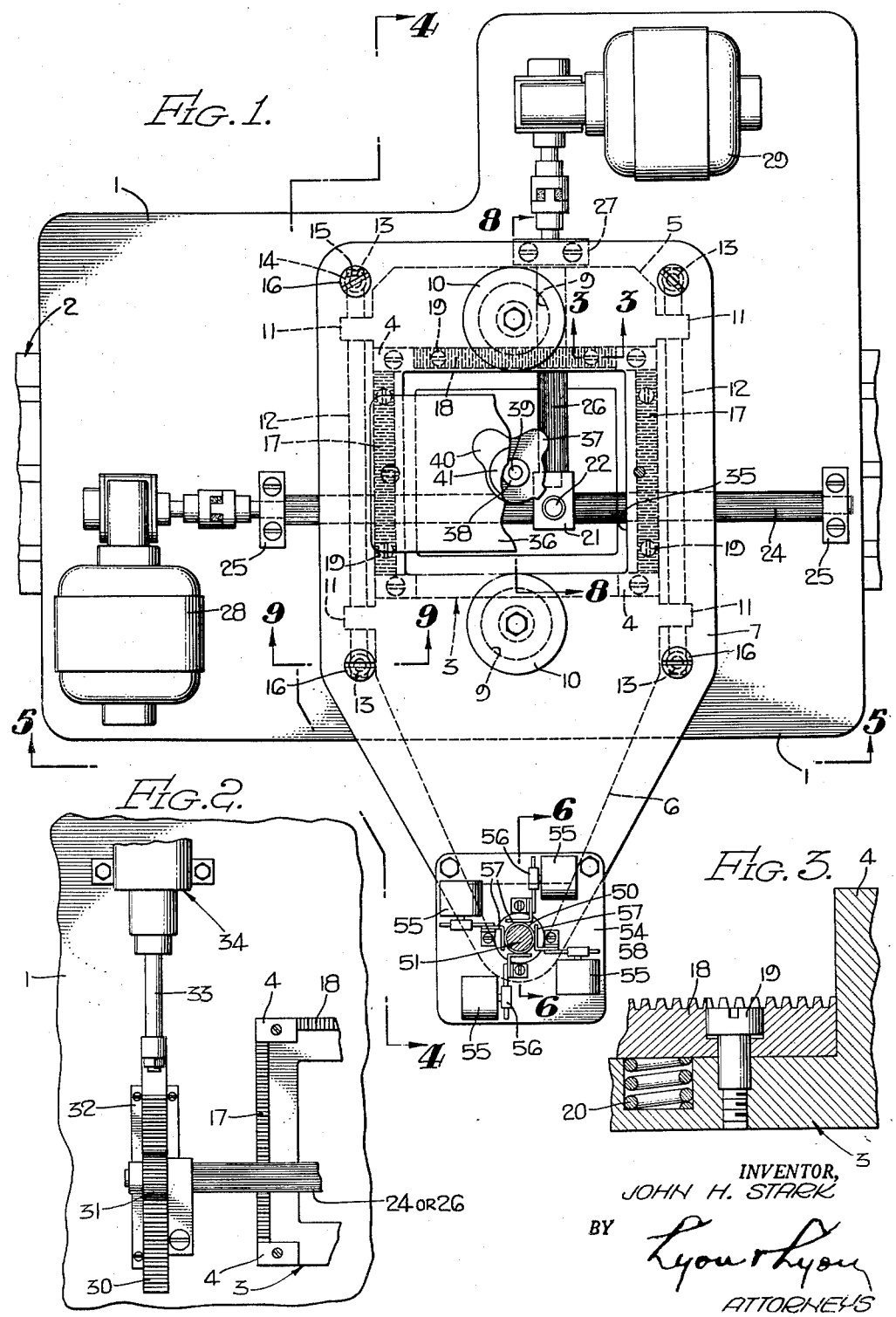
INVENTOR,
JOHN H. STARK
BY
Lyon & Lyon
ATTORNEYS

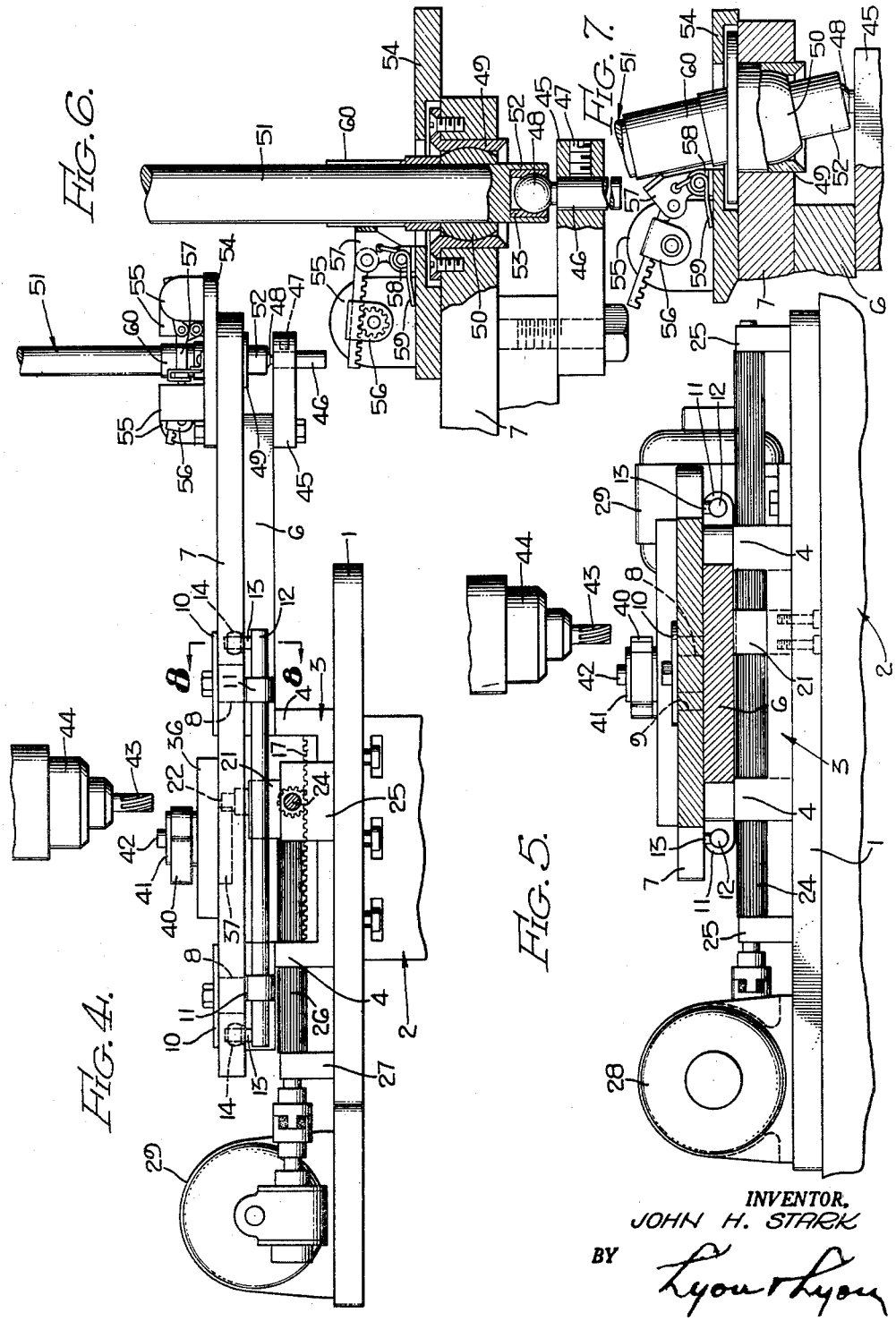

April 19, 1960
J. H. STARK
2,933,022
PROFILE CUTTER
Filed April 28, 1958
3 Sheets-Sheet 3
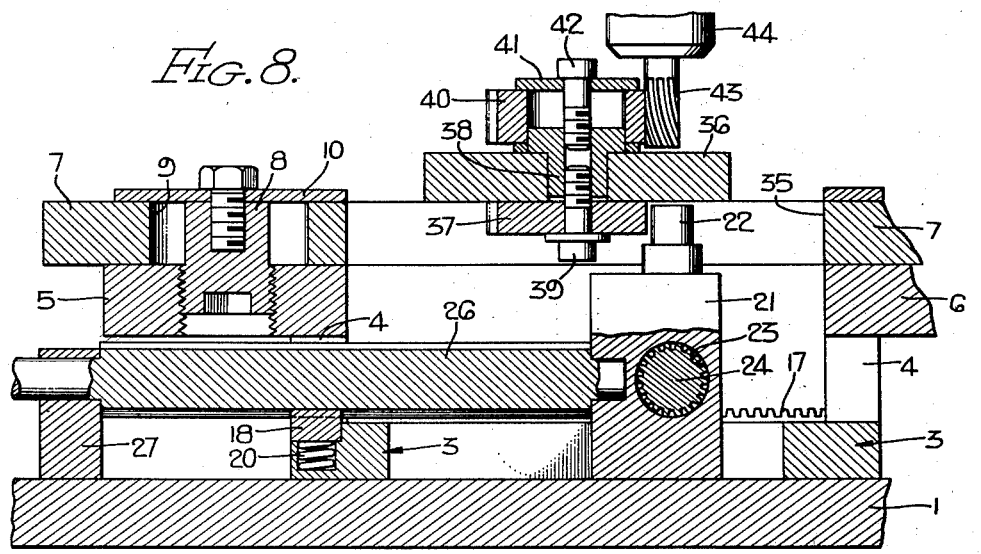
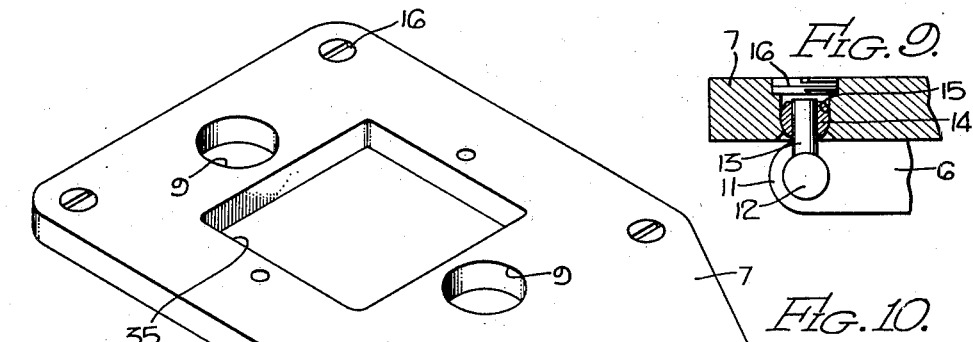
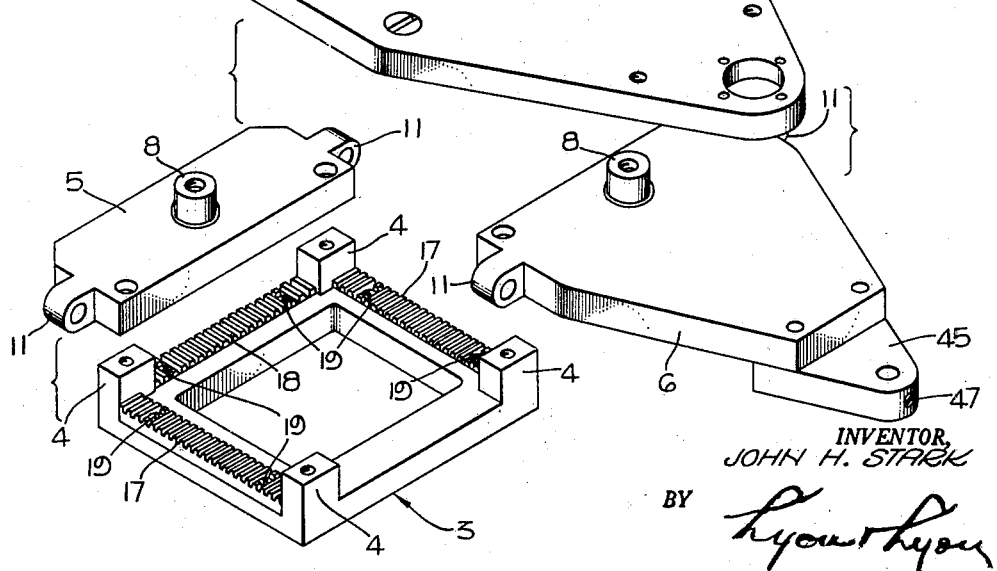
INVENTOR,
JOHN H. STARK
BY
Lyon & Lyon
ATTORNEYS

United States Patent Office 2,933,022
Patented Apr. 19, 1960

2,933,022

PROFILE CUTTER

John H. Stark, Burbank, Calif.

Application April 28, 1958, Serial No. 731,539

10 Claims. (Cl. 90—13.2)

This invention relates to profile cutting machines, and included in the objects of this invention are:

First, to provide a profile cutting machine which incorporates a novel feed mechanism, the feed mechanism including a manually operated feed lever tiltable in two directions and having a long handle for ease of control and a short working stroke, and a servo means arranged to advance the position of the fulcrum of the feed lever in accordance with the direction and extent of tilt of the feed lines, to compensate for the short working stroke of the feed lines, thereby providing a feed mechanism which is particularly sensitive to manual control whereby a template or pattern may be traced with fidelity to cause correspondingly accurate relative movement of the cutter and work piece.

Second, to provide a novel feed mechanism which though particularly adapted for profile cutting machines, is adaptable to the feeding of a work piece relative to a fixed tool or feeding of a tool relative to a fixed work piece and may be arranged with one as well as two directions of movement, thus providing a feed mechanism which may be adapted to the operation of drill presses, latches and milling machines.

Third, to provide a profile cutting machine which incorporates a novel sub-table operable by servo means and a super-table thereon which is so arranged as to have limited movement relative to the sub-table and which is manually controlled, and wherein the limited relative movement of the tables is utilized to operate control means for the servo means.

With the above and other objects in view, as may appear hereinafter, reference is directed to the accompanying drawings, in which:

Figure 1 is a plan view of the profile cutting machine shown constructed so as to be mounted on the carriage of a milling machine for use in conjunction with an end mill.

Figure 2 is a fragmentary view showing a modified servo motor means for operating the profile cutting machine.

Figure 3 is an enlarged fragmentary sectional view through 3—3 of Figure 1, showing a portion of the base frame and rack drive employed to move the base frame of the profile cutting machine.

Figure 4 is a longitudinal partial elevational view taken along the line 4—4 of Figure 1.

Figure 5 is a partial sectional view thereof taken along the line 5—5 of Figure 1.

Figure 6 is an enlarged fragmentary sectional view taken through 6—6 of Figure 1, showing the control lever in its neutral position.

Figure 7 is a similar fragmentary sectional view showing the control lever in a tilted position.

Figure 8 is an enlarged fragmentary sectional view through 8—8 of Figure 1.

Figure 9 is a fragmentary sectional view through 9—9 of Figure 1 showing the interconnection between the sub-carriage and super-carriage.

Figure 10 is an exploded perspective view showing the primary components of the sub-carriage and super-carriage.

The profile cutting machine includes a base structure 1 which may be in the form of a plate having a smooth upper surface and arranged for installation on the carriage 2 of a conventional milling machine of the type designed for end milling operations.

Slidably mounted on the surface of the base structure 1 is a sub-frame 3 in the form of a hollow rectangle. The corners of the sub-frame are provided with upwardly extending posts 4. Secured to the two rear corner posts, that is to the two posts which are rearward with respect to the milling machine carriage, is a rear plate 5 which projects rearwardly from the sub-frame 3. Similarly secured to the two forward corner posts 4 is a forward plate 6 which projects forwardly beyond the base structure 1. The upper surfaces of the rear plate 5 and forward plate 6 are coplanar. The sub-frame 3, rear plate 5 and forward plate 6 form a sub-carriage structure which is bodily slidable in two directions on the base structure 1.

Mounted on the plates 5 and 6 is a super-carriage plate 7 which is capable of limited movement in two directions relative to the sub-carriage. The rear and forward plates 5 and 6 are provided with bosses 8 which project through clearance apertures 9 in the super-carriage 7. The clearance apertures 9 are covered by retainer disks 10 which are secured to the bosses 8 so that the super-carriage 7 is retained on the sub-carriage.

The rear and forward plates 5 and 6 are provided with laterally directed guide bearings 11 arranged in aligned pairs, each of which receives a slide rod 12. A pair of slide rods are thus provided which extend forwardly and rearwardly along the sides of the rear and forward plates 5 and 6. The extremities of each slide rod 12 are provided with upwardly extending pins 13 on which are slidably mounted ball members 14. The ball members 14 journal universally in ball sockets 15 formed in the super-carriage 7. The sockets 15 are normally closed by screw caps 16 set flush in the super-carriage. The super-carriage is thus capable of limited forward and rearward translation movement relative to the sub-carriage by reason of the sliding movement of the slide rods 12 in the guide bearings 11; and is also capable of limited lateral translation by reason of pivotal movement of the pins 13 about the axes of the slide rods 12 and the companion sliding movement of the pins 13 in the ball members 14.

The two lateral sides of the sub-frame 3 between the corner posts are provided with a pair of forwardly and rearwardly directed translation racks 17. The rear side of the sub-frame is provided with a laterally directed translation rack 18. The racks are secured in place by retainer screws 19 which permit a limited vertical movement of the racks. The racks are urged upwardly a limited distance by springs 20 set in the sub-frame 3, as shown best in Figure 3.

Fixed to the base structure 1 within the opening provided in the rectangular sub-frame 3 is a follower pin block 21 having an upstanding follower pin 22. The block is provided with a lateral bore 23 which receives a translation pinion bar 24 positioned so as to extend laterally across the racks 17. The extremities of the pinion bar 24 project a substantial distance beyond the sides of the super-carriage 7 and are journalled in bearings 25. A second translation pinion bar 26 is journalled by one end in the pin block 21 and extends rearwardly therefrom across the rack 18. The rear end of the pinion bar 26 is journalled in a bearing 27. The pinion bar 24 on rotation causes forward and rearward translation of the sub-frame 3 and the structure mounted thereon, including the super-carriage 7. Similarly, the pinion bar 26 on rotation causes the sub-frame 3 to move laterally in either direction, that is in a direction longitudinally of the milling machine carriage 2.

The pinion bar 24 is connected at one end to a drive motor 28 whereas the rear end of the pinion bar 26 is connected to a drive motor 29. The drive motors, as shown in Figure 1, may be electric gear motors. However, air or hydraulic motors may be used. Still further, as shown in Figure 2, a reciprocating, as distinguished from a rotating, type of motor may be employed.

In the construction shown in Figure 2, a rack 30 is disposed under an extended end of the pinion bar 24 or 26 and engages the end pinion bar through a drive gear 31 mounted on the pinion bar. The rack is suitably retained in a guide 32 and is connected by a reciprocable rod 33 to a power cylinder 34.

The super-carriage 7 is provided with a large central clearance opening 35 which is adapted to be covered or partially covered by a work holder plate 36 arranged to be secured by any suitable means, not shown, to the upper surface of the super-carriage. Secured to the underside of the work holder plate is a template 37 having the desired configuration of the work piece to be profile machined. The template projects downwardly between the rear and forward plates 5 and 6, and its peripheral surface is adapted to be engaged by the follower pin 22. The template may be held in place by means of a bushing 38 and bolt 39. The bushing is also used to center a work piece 40. The work piece, as shown, is provided initially with a central bore to fit the bushing 38. However, inasmuch as various types of work pieces may be profile machined, a suitable fixture is substituted for the bushing 38 to accommodate a particular work piece.

In the construction illustrated, the follower pin 22 is intended to follow the periphery of the template 37. However, it should be noted that it is often desirable to profile mill an internal area, in which case the template is provided with an appropriate recess and the follower pin is caused to follow the internal periphery of such recess. It should be noted that the use of profile templates for either internal or external profile operations are well known in the art of profile milling.

In the construction illustrated, the work piece is held by a clamp plate 41 and bolt 42 but, as previously indicated, other securing means may be employed.

The follower pin is located so as to be coaxial with an end convntional mill 43 carried by a chuck 44, forming a part of the milling machine on which the base structure 1 is mounted. Conversely, the controls of the conventional milling machine may be operated to bring the end mill 43 into coaxial relation with the follower pin 22. Usually the follower pin 22 and end mill are of equal diameter but this is not always necessarily the case.

The forward plate 6 is provided at its forward end with a bracket 45 which carries a vertically adjustable stem 46 adapted to be locked in place by a set screw 47. The stem 46 terminates in a primary fulcrum ball 48 projecting upwardly from the bracket 45. The forward extremity of the supper-carriage 7 is provided with an aperture overlying and in registry with fulcrum pin ball 48. The aperture receives a socket shell 49 which journals a secondary fulcrum ball sleeve 50. A feed lever 51 is provided with a cylindrical stem 52 which is axially slidable in the secondary fulcrum ball sleeve 50. The lower end of the stem 52 is provided with a socket 53 which journals on the primary fulcrum ball 48.

Mounted on the forward end of the super-carriage 7 is a plate 54 which surrounds the stem 52 of the feed lever. The plate 54 supports four motor control units 55. The motor control units may be variable transformers or rheostats or valve units but in any case are so arranged that they may effect control of the driving motors 28, 29 or the power cylinder 34.

In the construction shown each motor control unit is connected by a rack and pinion drive 56 to a lever arm 57 pivotally mounted on a bracket 58 at one side of the stem 52. Springs 59 urge each of the lever arms 57 against the stem 52 or against a guard sleeve 60 surrounding the stem.

The lever arms 57 are positioned 90 degrees from each other, one pair being located forwardly and rearwardly of the stem 52 and the other bearing being located laterally.

The upper end of the feed lever 51 is provided with a suitable hand grip, not shown. The pivotal points of the primary fulcrum ball 48 and secondary fulcrum ball sleeve 50 are located relatively close to each other so that the application of a nominal mannual force on the handle end of the feed lever 51 asserts a substantial force tending to move the super-carriage relative to the sub-carriage, that is, relative to the rear and forward plates 5 and 6.

Operation of the profile cutting machine is as follows:

For purposes of illustration, a template 37 having an external profile is shown below the work holder plate 36 and a corresponding work piece 40 is shown mounted thereon. The template follower pin 22 and milling cutter are initially located at one side of and clear of the template and work piece, respectively. The template and work piece are brought into contact with the upper pin and milling cutter by appropriate movement of the hand feed lever 51. Initially, manual operation of the hand feed lever moves the super-carriage 7 relative to the sub-carriage, that is, the handle lever pivots about the primary fulcrum ball 48. This movement, however, engages one or an adjacent pair of lever arms 57 which in turn operate their respective control units 55. The control units in turn operate the motors 28 and 29 or the power cylinders 34 to cause a compensating movement of the sub-carriage about the pivot point of the secondary fulcrum ball sleeve 50. This movement has the tendency to restore the handle lever to its vertical or neutral position. However, continued lateral pressure exerted manually by the operator on the feed lever continuously advances the super-carriage until the template follower pin 22 engages the template. Such engagement arrests movement of the super-carriage 7 but the sub-carriage continues to move until the hand lever is forced to its vertical or neutral position. Similarly, tilting of the hand lever in the appropriate direction to trace the outline of the template causes compensating movement of the sub-carriage. By reason of the fact that both the super-carriage and sub-carriage are capable of movement freely in two directions, the entire periphery of the template may be traced.

It will be observed that by reason of the fact that the drive motors operating as servo motors continually move the sub-carriage in a direction to compensate for movement of the super-carriage, only a nominal amount of relative movement between the super-carriage and sub-carriage is needed. Consequently, the mechanical advantage of a close couple between the primary and secondary fulcrums may be utilized. Thus, the operator need not be called upon to exert more than nominal physical force in order to trace the profile of the template, even though the material being milled offers substantial resistance.

It should be observed that whenever the follower pin is stopped by engagement with the template or other fixed or contoured stop, further cutting cannot occur and the servo motors exert a substantial force to bring the hand lever to its neutral position.

While the machine is primarily intended to perform contour or profile milling operations, it is adapted to other operations. For example, in a straight milling operation engagment of the follower pin, any suitably positioned stop member will stop the movement of the super-carriage at a precise point. Thus, in many milling or other machining operations other than those involved in an end mill, accurate duplicate parts may be readily machined or milled by utilizing the super-carriage and sub-carriage in conjunction with the hand lever and servo motors.

Further more, while the drawings illustrate a construction in which movement in two directions is possible, movement may be confined to one direction as, for example, forward and rearward with respect to the milling machine carriage.

While particular embodiments of this invention have been shown and described, it is not intended to limit the same to the exact details of the constructions set forth, and it embraces such changes, modifications, and equivalents of the parts and their formation and arrangement as come within the purview of the appended claims.

I claim:

1. A profile cutting machine, comprising: a sub-carriage capable of movement along two coplanar axes; drive means for effecting movement of said sub-carriage along said axes; a super-carriage mounted on said sub-carriage and capable of predetermined limited movement relative to said sub-carriage along said two axes; means for moving said super-carriage along said two axes relative to said sub-carriage; and mechanism operated by said super-carriage moving means for actuating said drive means to effect movement of said sub-table in a direction corresponding to the movement of said super-carriage.

2. A profile cutting machine, comprising: a sub-carriage capable of movement along two coplanar axes; drive means for effecting movement of said sub-carriage along said axes; a super-carriage mounted on said sub-carriage and capable of predetermined limited movement relative to said sub-carriage along said two axes; means for moving said super-carriage along said two axes relative to said sub-carriage; mechanism operated by said super-carriage moving means for actuating said drive means to effect movement of said sub-table in a direction corresponding to the movement of said super-carriage; a fixed template follower under said super-carriage; means for supporting a cutting tool in coaxial relation with said follower; and means for securing a template and a work piece to said super-carriage for engagement respectively by said follower and said tool.

3. Feed means for effecting relative movement of a work piece element and a cutting tool element, comprising: a first structure capable of reciprocation along at least one axis; drive means to effect said movement of the first structure; a second structure carried by said first structure and arranged for limited movement along said axis relative to said first structure; manually operated means for effecting said relative movement; and control means for said drive means to effect corresponding movement of said first structure to compensate for said relative movement of said second structure, one of said elements being fixed on said second structure for movement therewith relative to the other of said elements.

4. Feed means for effecting relative movement of a work piece element and a cutting tool element, comprising: a first structure capable of movement along two intersecting axes; drive means to effect movement of said first structure along either or both said axes; a second structure carried by said first structure and arranged for limited movement along either or both said axes relative to said first structure; manually operated means for effecting said relative movement; and control means for said drive means to effect corresponding movement of said first structure to compensate for said relative movement of said second structure, one of said element being fixed on said second structure for movement therewith relative to the other of said elements.

5. Feed means for effecting relative movement of a work piece element and a cutting pool element, comprising: a first structure capable of reciprocation along at least one axis; drive means to effect said movement of the first structure; a second structure carried by said first structure and arranged for limited movement along said axis relative to said first structure; a manually operated lever having a first fulcrum connecting said lever with said first structure and a second fulcrum connecting said second structure, said lever adapted to effect movement of said second structure relative to said first structure on movement about said first fulcrum; and control means engageable by said lever on movement about said first fulcrum to cause operation of said drive means to move said first structure relative to said second structure to compensate for movement of said lever about said first axis, one of said elements being fixed to said second structure for movement therewith relative to the other of said elements.

6. Feed means for effecting relative movement of a work piece element and a cutting tool element, comprising: a first structure capable of movement along two intersecting axes; drive means to effect movement of said first structure along either or both said axes; a second structure carried by said first structure and arranged for limited movement along either or both said axes relative to said first structure; a manually operated lever having a first fulcrum affording a universal connection between said lever and said first structure, and a second fulcrum affording a universal connection between said lever and said second structure, said lever adapted to effect movement of said second structure relative to said first structure on movement about said first fulcrum; and control means engageable by said lever on movement about said first fulcrum to cause operation of said drive means to move said first structure relative to said second structure to compensate for movement of said lever about said first axis, one of said elements being fixed to said second structure for movement therewith relative to the other of said elements.

7. A profile cutting machine, comprising: a base plate structure; a template follower fixed thereon and adapted to be located in coaxial relation with a cutting tool; a sub-carriage movable along two axes parallel with said base plate structure; drive means for said sub-carriage; a super-carriage mounted on said sub-carriage and arranged for limited movement along two axes parallel to said base plate structure a predetermined limited distance relative to said sub-carriage; manually operated means for effecting said movement of the super-carriage on the sub-carriage; control means for said drive means actuated by said manually operated means to effect movement of said sub-carriage relative to said base in a direction to compensate for movement of said super-carriage on said sub-carriage; and means for mounting a template and a work piece on said super-carriage for engagement respectively by said template follower and said cutting tool.

8. A profile cutting machine, comprising: a base plate structure; a template follower fixed thereon and adapted to be located in coaxial relation with a cutting tool; a sub-carriage movable along two axes parallel with said base plate structure; drive means for said sub-carriage; a super-carriage mounted on said sub-carriage and arranged for limited movement along two axes parallel to said base plate structure a predetermined limited distance relative to said sub-carriage; a manually operated lever having a universal first fulcrum connected with said sub-carriage, and a universal second fulcrum connected with said super-carriage; said lever adapted to effect movement of said super-carriage on said sub-carriage on movement about said first fulcrum; a control means engageable by said lever on movement about said first fulcrum to cause opreation of said drive means in a direction to effect compensating movement of said sub-carriage relative to said base structure; and means for mounting a template and a work piece on said super carriage for engagement respectively by said template follower and said cutting tool.

9. A profile cutting machine, comprising: a base plate structure; a template follower fixed thereon and adapted to be located in coaxial relation with a cutting tool; a sub-carriage movable along two axes parallel with said base plate structure; drive means for said sub-carriage including right angularly disposed drive racks on said sub-carriage, elongated pinion shafts rotatably secured to said base structure and motors for rotating said pinion shafts; a super-carriage mounted on said sub-carriage and arranged for limited movement along two axes parallel to said base plate structure a predetermined limited distance relative to said sub-carriage; manually operated means for effecting said movement of the super-carriage on the sub-carriage; control means for said drive means actuated by said manually operated means to effect movement of said sub-carriage relative to said base in a direction to compensate for movement of said super-carriage on said sub-carriage; and means for mounting a template and a work piece on said super-carriage for engagement respectively by said template follower and said cutting tool.

10. A profile cutting machine, comprising; a base plate structure; a template follower fixed thereon and adapted to be located in coaxial relation with a cutting tool; a sub-carriage movable along two axes parallel with said base plate structure; drive means for said sub-carriage including right angularly disposed drive racks on said sub-carriage, elongated pinion shafts rotatably secured to said base structure and motors for rotating said pinion shafts; a super-carriage mounted on said sub-carriage and arranged for limited movement along two axes parallel to said base plate structure a predetermined limited distance relative to said sub-carriage; a manually operated lever having a universal first fulcrum connected with said sub-carriage, and a universal second fulcrum connected with said super-carriage; said lever adapted to effect movement of said super-carriage on said sub-carriage on movement about said first fulcrum; a control means engageable by said lever on movement about said first fulcrum to cause operation of said drive means in a direction to effect compensating movement of said sub-carriage relative to said base structure; and means for mounting a template and a work piece on said super carriage for engagement respectively by said template follower and said cutting tool.

References Cited in the file of this patent

UNITED STATES PATENTS

| | | |
|---|---|---|
| 2,005,696 | Gorton et al. | June 18, 1935 |
| 2,449,252 | Rothweiler | Sept. 14, 1949 |
| 2,667,193 | Sherman | Jan. 26, 1954 |
| 2,728,270 | Pittinger | Dec. 27, 1955 |